United States Patent [19]

Fouratt

[11] 4,031,333

[45] June 21, 1977

[54] CIRCUIT TO INDICATE THE SIMULTANEOUS OFF-HOOK CONDITION OF AT LEAST TWO OF A PLURALITY OF TELEPHONE SUBSETS ON THE SAME TELEPHONE LINE

[75] Inventor: George Thomas Fouratt, Santa Maria, Calif.

[73] Assignee: International Telephone and Telegraph Corporation, Nutley, N.J.

[22] Filed: July 14, 1976

[21] Appl. No.: 705,218

[52] U.S. Cl. .............................. 179/81 R; 179/81 C
[51] Int. Cl.² ......................................... H04M 1/00
[58] Field of Search ............. 179/81 R, 81 C, 81 E, 179/84 B, 84 C, 84 L, 99, 17 B, 19, 30, 38

[56] References Cited

UNITED STATES PATENTS

| 1,256,123 | 2/1918 | Galitzka | 179/81 C |
| 1,991,383 | 2/1935 | Fator | 179/81 C |
| 2,496,642 | 2/1950 | Shann | 179/81 C |

*Primary Examiner*—Kathleen H. Claffy
*Assistant Examiner*—Joseph Popek
*Attorney, Agent, or Firm*—John T. O'Halloran; Alfred C. Hill

[57] ABSTRACT

A visual indicator is contained in each of a plurality of telephone subsets on the same telephone line. A logic circuit is connected between the hookswitch of each of the plurality of telephone subsets and each of the visual indicators to activate the visual indicators when at least two of the plurality of subsets are detected to be in an off-hook condition simultaneously.

16 Claims, 1 Drawing Figure

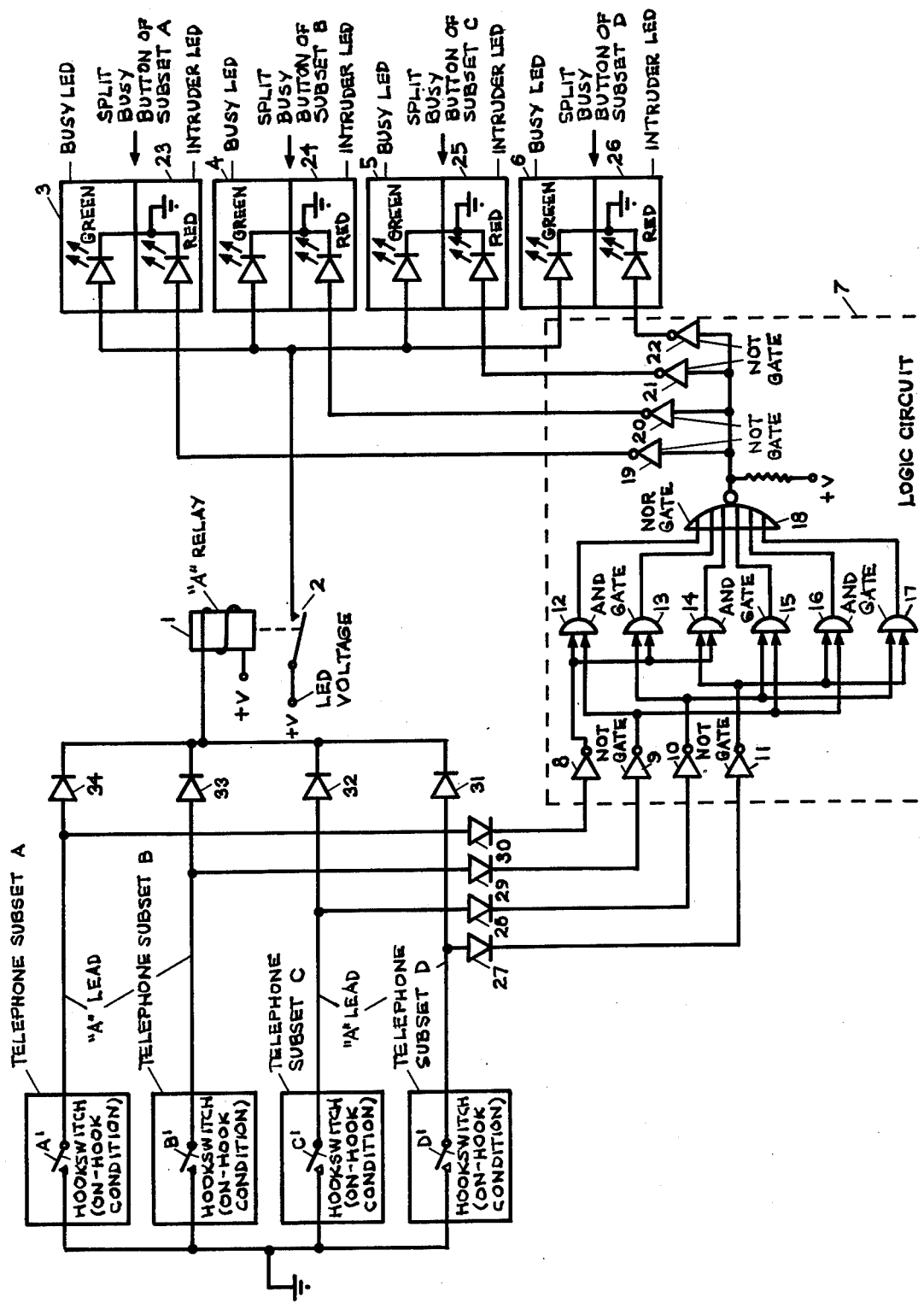

CIRCUIT TO INDICATE THE SIMULTANEOUS OFF-HOOK CONDITION OF AT LEAST TWO OF A PLURALITY OF TELEPHONE SUBSETS ON THE SAME TELEPHONE LINE

BACKGROUND OF THE INVENTION

This invention relates to telephone systems and more particularly to a telephone system having a plurality of telephone subsets on the same telephone line.

When there are a plurality of telephone subsets on the same telephone line, there is at present no way of knowing whether the conversation of a user of one telephone subset is being monitored by a person on another of the telephone subsets. As a result, the telephone subset user does not have confidence that a conversation which may be personal in nature is not being monitored.

SUMMARY OF THE INVENTION

An object of the present invention is to provide a circuit to alert a telephone user of one of a plurality of telephone subsets on the same telephone line when someone is listening to the conversation of the telephone user.

A feature of the present invention is the provision of an indicator circuit for a telephone system to indicate when at least two of a plurality of telephone subsets on the same telephone line are simultaneously in an off-hook condition comprising: at least one indicator contained in one of the plurality of subsets which when activated indicates that at least the one of the plurality of subsets and another of the plurality of subsets are in the off-hook condition simultaneously; and a logic circuit coupled between all of the plurality of subsets and the indicator to produce an output signal to activate the indicator when at least the one of the plurality of subsets and the another of the plurality of subsets are detected to be in the off-hook condition simultaneously.

BRIEF DESCRIPTION OF THE DRAWING

The above-mentioned and other features and objects of this invention and the manner of obtaining them will become more apparent by reference to the following description taken in conjunction with the drawing, the single Figure of which is a schematic diagram of an indicator circuit in accordance with the principles of the present invention.

DESCRIPTION OF THE PREFERRED EMBODIMENT

As illustrated in the Figure for purposes of explanation there are four key type telephone subsets A - D connected to the same telephone line, each of which includes a hookswitch A' - D', respectively. When any one of the hookswitches A' - D' are placed in the off-hook condition (switch closed) a ground potential is coupled by an "A" lead to the "A" relay 1. The ground potential on the "A" lead actuates relay 1 and closes contact 2 thereby applying a positive voltage to the busy light emitting devices, such as light emitting diodes (LED), indicated at 3 - 6. The LEDs 3 - 6 will be lit in the usual fashion when relay 1 is operated to indicate that the line is busy. The busy LEDs 3 - 6 are each disposed in one-half of a split busy button contained in each of the subsets A - D.

The ground that activated relay 1 due to an off-hook condition of one of the subsets A - D is coupled to logic circuit 7 and more particularly to the associated one of the NOT gates 8 - 11. The outputs of the NOT gates 8 - 11 are coupled in different pairs to AND gates 12 - 17 as illustrated. The output of the AND gates 12 - 17 are coupled to a NOR gate 18 whose output is coupled to NOT gates 19 - 22. The outputs of NOT gates 19 - 22 are respectively coupled to the intruder LEDs 23 - 26 disposed in the other half of the split busy button of each of the subsets A - D.

Diodes 27 - 34 are blocking diodes to prevent interaction between the actuation of relay 1 and the operation of logic circuit 7.

When another station gains access to the telephone line by going to an off-hook condition, one of the AND gates 12 - 17 will be activated by the logic "1" output from an associated pair of NOT gates 8 - 11 providing a logic "1" output of one of the AND gates 12 - 17. NOR gate 18 inverts the logic "1" output of the activated AND gate and produces a logic "1" which in turn is inverted to a logic "1" output by NOT gates 19 - 22 to energize the intruder LEDs 23 - 26. When the intruder LEDs are activated, this alerts the talker that someone else is in the off-hook condition and on the telephone line which enables monitoring of the original talker's conversation.

As an example of the operation of the indicator circuit of the present invention, assume that subsets A and B are simultaneously in the off-hook condition. This will apply the ground or a logic "0" to the input of NOT gates 8 and 9. NOT gates 8 and 9 invert the logic "0" and provide a logic "1" output which are coupled to AND gate 12 resulting in a logic "1" output from AND gate 12. None of the other AND gates 13 - 17 will produce a logic "1" output since both of their inputs are not at logic "1". The logic "1" output of AND gate 12 is coupled to NOR gate 18 which inverts the logic "1" output of AND gate 12 to logic "0" which is applied to the input of each of the NOT gates 19 - 22. NOT gates 19 - 22 invert the logic "0" output of NOR gate 18 providing at the output of NOT gates 19 - 22 a logic "1" which has a sufficient value of voltage to energize and thereby light the intruder LEDs 23 - 26 to indicate that there is an intruder on the line and that the conversation is being monitored.

In summary, the busy LEDs 3 - 6 are energized by the actuation of relay 1 in the usual fashion and the logic circuit 7 indicates when two or more subsets are in the off-hook condition by energizing the intruder LEDs 23 - 26.

The foregoing description has been directed to key telephone subsets, but the same principle could easily be applied to regular subsets with one or more extensions. The logic circuit 7 may have various logic arrangements depending on the type of subset involved and also the ground in the key telephone subset that is coupled on the "A" leads could come from different contacts on the telephone key enabling the elimination of the blocking diodes. The principle advantage regardless of the telephone subset used and the arrangement of the logic circuit is to provide a telephone user with confidence that his conversation is not being monitored.

While I have described above the principles of my invention in connection with specific apparatus it is to be clearly understood that this description is made only by way of example and not as a limitation to the scope of my invention as set forth in the objects thereof and in the accompanying claims.

I CLAIM:

1. An indicator circuit for a telephone system to indicate when at least two of a plurality of telephone subsets on the same telephone line are simultaneously in off-hook condition comprising:
   at least one indicator contained in one of said plurality of subsets which when activated indicates that at least said one of said plurality of subsets and another of said plurality of subsets are in said off-hook condition simultaneously; and
   a logic circuit coupled between all of said plurality of subsets and said indicator to produce an output signal to activate said indicator when at least said one of said plurality of subsets and said another of said plurality of subsets are detected to be in said offhook condition simultaneously.

2. A circuit according to claim 1, wherein said indicator is a visual indicator.

3. A circuit according to claim 2, wherein said visual indicator is a first light emitting device disposed in one half of a split busy button disposed in said one of said plurality of subsets.

4. A circuit according to claim 3, wherein said first light emitting device is a light emitting diode.

5. A circuit according to claim 3, further including a second light emitting device disposed in the other half of said split busy lamp and
   a relay coupled between a hookswitch of all of said plurality of subsets and said second light emitting device, said relay being activated when said one of said plurality of subsets is in said off-hook condition to energize said second light emitting device to emit light indicating said telephone line is busy.

6. A circuit according to claim 5, wherein said second light emitting device is a light emitting diode.

7. A circuit according to claim 5, wherein said logic circuit includes
   a plurality of NOT gates each coupled to a different one of said plurality of subsets,
   a plurality of AND gates each coupled to a different pair of said plurality of NOT gates,
   a NOR gate coupled to the output of each of said plurality of AND gates, and
   a NOT gate coupled between the output of said NOR gate and said first light emitting device.

8. A circuit according to claim 1, wherein said logic circuit includes
   a plurality of NOT gates each coupled to a different one of said plurality of subsets,
   a plurality of AND gates each coupled to a different pair of said plurality of NOT gates,
   a NOR gate coupled to the output of each of said plurality of AND gates, and
   a NOT gate coupled between the output of said NOR gate and said indicator.

9. A circuit according to claim 1, wherein
   each of said plurality of subsets includes said indicator, and
   said logic circuit is coupled to each of said indicators.

10. A circuit according to claim 9, wherein each of said indicators is a visual indicator.

11. A circuit according to claim 10, wherein each of said visual indicators is a first light emitting device disposed in one half of a split busy button disposed in each of said plurality of subsets.

12. A circuit according to claim 11, wherein each of said first light emitting devices is a light emitting diode.

13. A circuit according to claim 11, further including a second light emitting device disposed in the other half of each of said split busy lamps; and
    a relay coupled between a hookswitch of all of said plurality of subsets and all of said second light emitting devices, said relay being activated when any one of said plurality of subsets is in said off-hook condition to energize each of said second light emitting devices to emit light indicating said telephone line is busy.

14. A circuit according to claim 13, wherein each of said second light emitting devices is a light emitting diode.

15. A circuit according to claim 13, wherein said logic circuit includes
    a first plurality of NOT gates each coupled to a different one of said plurality of subsets,
    a plurality of AND gates each coupled to a different pair of said first plurality of NOT gates,
    a NOR gate coupled to the output of each of said plurality of AND gates, and
    a second plurality of NOT gates each coupled between the output of said NOR gate and a different one of said first light emitting devices.

16. A circuit according to claim 9, wherein said logic circuit includes
    a first plurality of NOT gates each coupled to a different one of said plurality of subsets,
    a plurality of AND gates each coupled to a different pair of said first plurality of NOT gates
    a NOR gate coupled to the output of each of said plurality of AND gates, and
    a second plurality of NOT gates each coupled between the output of said NOR gate and a different one of said indicators.

* * * * *